Figure 1:
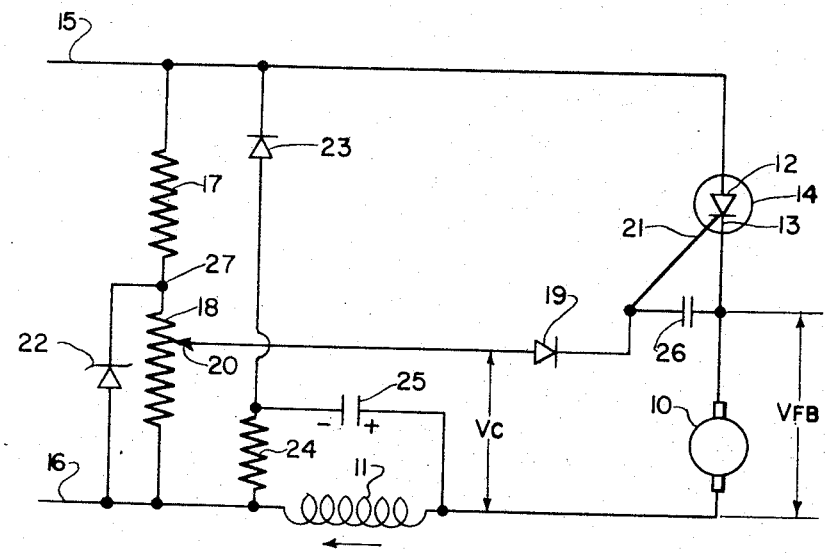

INVENTOR.
JERRY WIGINGTON

United States Patent Office 3,329,879
Patented July 4, 1967

---

3,329,879
CONTROLLED RECTIFIER SUPPLY FOR ELECTRIC MOTORS HAVING NEGATIVELY SLOPED ARMATURE SPEED VOLTAGES
Jerry Wigington, Pickens, S.C., assignor to The Singer Company, New York, N.Y., a corporation of New Jersey
Filed July 29, 1964, Ser. No. 385,866
4 Claims. (Cl. 318—331)

The present invention relates to speed-regulating control circuits for series commutator motors fed from an A.C. supply voltage and more specifically to circuits employing a solid-state controlled rectifier wherein the speed voltage generated by the armature is compared with an adjustable reference voltage to control the firing of said rectifier.

In prior art circuits the armature speed voltage has been derived either from the residual field flux in which case it has a constant D.C. level for a given speed, or from the field flux furnished directly from the A.C. supply in which case it has a sinusoidal shape as a time function.

It has been found advantageous to use a feedback speed voltage which has a continuous negative slope as a function of time in order to fire the rectifier at points in the positive half cycles of line voltage beyond the peaks.

This negative slope characteristic has been obtained according to this invention by providing novel circuitry for charging a capacitor during the negative half cycles of line voltage and for discharging the capacitor through the series field winding when the line voltage swings positive.

It is accordingly an object of this invention to provide simple means for shaping a speed voltage supplied by the armature of a series commutator motor and for using said voltage to control the firing of a solid state controlled rectifier to control the motor speed.

A more specific object of this invention is to use the half cycles when the controlled rectifier is in its off or blocking state to charge a capacitor which is discharged through the field winding on the positive swings of the line voltage to produce a field excitation decreasing with time to provide a negatively sloped feedback speed signal from the armature winding, which signal is combined with a clipped sinusoidal reference voltage due to Zener action to obtain the gate firing voltage for the controlled rectifier.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

Figure 2:
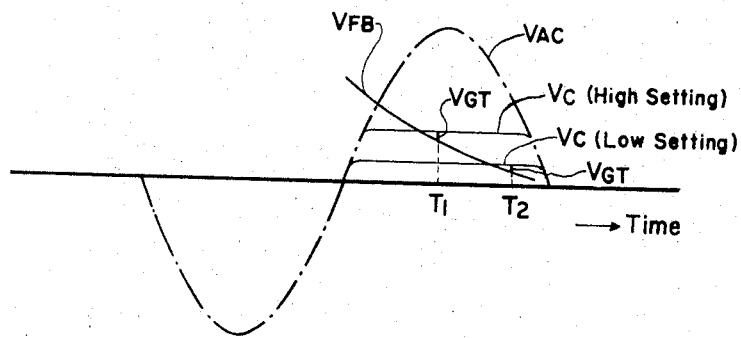

In the drawings:

FIG. 1 is a circuit diagram illustrating a preferred embodiment of the invention, FIG. 2 is a diagram illustrating the waveforms of certain voltages in the circuit of FIG. 1.

Referring to FIG. 1, a series commutator motor has an armature winding 10 and a field winding 11 connected in series with the anode 12 and cathode 13 of a silicon controlled rectifieer 14 across an A.C. voltage source (not shown) adapted to be connected to leads 15 and 16. A voltage divider comprising series-connected resistor 17 and potentiometer 18 is connected to leads 15 and 16. A diode 19 is connected between a slider 20 on potentiometer 18 and the gate 21 of the controlled rectifier 14. A Zener diode 22 is connected in shunt with the potentiometer 18. A second diode 23 is connected in series with a resistor 24 across leads 15 and 16, and a capacitor 25 connects from the junction between the field winding 11 and the armature winding 10 to the junction between the resistor 24 and the diode 23. A capacitor 26 is connected between the gate 21 and the cathode 13 of the controlled rectifier 14.

In operation, on positive swings of the A.C. voltage, VAC, at leads 15, 16 the voltage at point 27 is clipped to the Zener voltage to provide a D.C. level as is well understood in the art. On negative swings of the A.C. voltage, the voltage at point 27 is reduced to the small forward drop of the Zener diode 22. The reference voltage $V_c$ will be proportional to the voltage at point 27 and depends on the setting of slider 20. This is shown in FIG. 2 where the voltages $V_c$ and VFB as indicated in FIG. 1 are plotted as functions of time relative to the A.C. line voltage VAC impressed on leads 15, 16.

I will be seen that on the negative half cycles of VAC, the capacitor 25 is charged through the field winding 11 and diode 23 with the polarity as indicated in FIG. 1. When the line voltage VAC again swings positive the capacitor 25 discharges through the field winding 11 and resistor 24. This discharge current through the field is in the direction indicated by the arrow in FIG. 1 and is in the same direction as the current supplied when the controlled rectifier 14 conducts. The time rate at which this current decreases is a function of the capacitance of capacitor 25 and the resistance of resistor 24 and may readily be controlled by proper choice of resistor 24. This decreasing field current produces a feedback voltage VFB which has a negative slope as seen in FIG. 2. Since the controlled rectifier 14 fires only during the positive half cycles of VAC when $V_c - VFB = VGT$ (the gate-cathode firing voltage) it will be seen that, with the negatively-sloped feedback voltage VFB, firing can occur at point $T_2$, i.e., late in the cycle for slow speeds, or at $T_1$, i.e., early in the cycle for high speeds.

From the above description, it will be apparent that there is provided according to this invention simple circuit means for shaping the time function of the armature feedback speed voltage to produce a negative slope of proper value whereby firing of the controlled rectifier may be made to occur during the positive half cycles of line voltage including points very late in the cycle and near to zero voltage. This produces good stable speeds down to very low speeds.

What is claimed is:

1. A speed-responsive control circuit for an electric motor having series-connected armature and field windings fed from a source of A.C. voltage; said control circuit comprising, a solid state controlled rectifier having an anode and a cathode connected in series with the armature winding, the field winding and the source, and having a gate-cathode circuit; a signal channel including said armature winding for transmitting to said gate-cathode circuit the back EMF of said armature winding as negative bias therefor; adjustable means energized by said source to produce a reference signal; means connecting said reference signal in series opposition to said back EMF with respect to the gate-cathode circuit; and means controlling the time function of the current to the field winding during periods of nonconduction of the controlled rectifier including, a capacitor, a diode for charging said capacitor from said source during times when the anode voltage is negative with respect to the cathode, means for discharging the capacitor through the field winding when the anode voltage swings positive, and means for controlling the time rate of discharge of said capacitor.

2. A speed-responsive control circuit for an electric motor having series-connected armature and field windings fed from a source of A.C. voltage; said control circuit comprising, a solid state controlled rectifier having an anode and a cathode connected in series with said armature winding, said field winding and said source, and having a gate-cathode circuit; a signal channel including said armature winding for transmitting to said gate-cathode circuit the back EMF of said armature winding as negative bias therefor; means energized by said source to produce a reference signal having an adjustable D.C. level; means connecting said reference signal in series opposition to said back EMF with respect to the gate-cathode circuit; and means providing an excitation for the field winding which is decreasing as a function of time during periods of non-conduction of the controlled rectifier including, a capacitor, diode means for charging said capacitor from said source during times when the anode voltage is negative with respect to the cathode, means for discharging the capacitor through the field winding when the anode voltage swings positive, and means for controlling the time rate of discharge of said capacitor.

3. A motor control circuit comprising a series commutator motor having an armature winding and a field winding; a pair of leads adapted for connection to an alternating current source; means in series circuit relation with said armature and field windings between said leads for rectifying alternating current from said source for variably energizing said armature and field windings, said means including a solid state controlled rectifier having an anode, a cathode, a gate, a signal channel including said armature winding for applying between said gate and cathode the back EMF of said armature winding as negative bias therefor, means energized by said source to produce a reference signal having an adjustable D.C. level, and means connecting said reference signal in series opposition to said back EMF with respect to said gate and cathode; and means controlling the time function of the current to the field winding during periods of nonconduction of the controlled rectifier including, a capacitor, diode means for charging said capacitor from said source during times when the anode voltage is negative with respect to the cathode, means for discharging said capacitor through the field winding when the anode voltage swings positive, and means for controlling the time rate of discharge of said capacitor.

4. A circuit for controlling the speed of an electric motor having series-connected armature and field windings adapted to be supplied from an alternating current source, said circuit comprising, a solid-state controlled rectifier having an anode, a cathode and a gate; circuit means including the anode, the cathode, the armature winding and the field winding connected in series with said source; means independently of said rectifier controlling the current to the field winding including a capacitor, diode means for charging said capacitor from said source during times when the anode voltage is negative with respect to the cathode, circuit means for discharging said capacitor through the field winding when the anode voltage swings positive, and means for controlling the time rate of discharge of said capacitor; and a signal channel including said armature winding and a variable reference signal source in series with said gate and cathode.

References Cited
UNITED STATES PATENTS

| Re. 25,203 | 7/1962 | Momberg et al. | 318—246 |
| 3,165,688 | 1/1965 | Gutzwiller | 318—331 X |
| 3,191,112 | 6/1965 | Cain | 318—331 X |
| 3,222,583 | 12/1965 | Gutzwiller | 318—246 |

ORIS L. RADER, *Primary Examiner.*

J. C. BERENZWEIG, J. J. BAKER, *Assistant Examiners.*